United States Patent [19] [11] 3,866,963
Weller [45] Feb. 18, 1975

[54] ENERGY ABSORBING BUMPER ASSEMBLY
[75] Inventor: Peter A. Weller, Durham, N.H.
[73] Assignee: McCord Corporation, Detroit, Mich.
[22] Filed: Aug. 13, 1973
[21] Appl. No.: 388,025

[52] U.S. Cl. ............... 293/88, 293/71 R, 267/140
[51] Int. Cl. ............................................. B60r 19/08
[58] Field of Search ............ 293/71 R, 71 P, 86, 88; 114/219; 267/140

[56] References Cited
UNITED STATES PATENTS
1,515,255   11/1924   Kerber ............................... 293/88
3,361,467   1/1968    Ludwikowski ..................... 293/88
3,638,985   2/1972    Barton et al. ..................... 293/71 R
3,666,310   5/1972    Burgess et al. .................. 293/71 R FOREIGN PATENTS OR APPLICATIONS
639,747     5/1962    Italy ................................... 293/86
1,035,216   8/1953    France ............................... 293/71

Primary Examiner—M. Henson Wood, Jr.
Assistant Examiner—Robert Saifer
Attorney, Agent, or Firm—McGlynn and Milton

[57] ABSTRACT

An energy absorbing bumper assembly including a mounting means defined by a metal plate adapted for attachment to a vehicle and an elongated shell made of elastomeric material disposed adjacent or forwardly of the mounting plate. A pair of urethane energy absorbing blocks are disposed adjacent the centerline of the bumper assembly between the frontal face of the shell and the mounting plate. A second pair of energy absorbing urethane blocks are disposed adjacent the ends of the assembly between the frontal face of the shell and the mounting plate. The shell is an integral member which includes a horizontal web having a first section at each end of the shell adjacent the outwardly disposed urethane blocks and extending longitudinally of the shell and engaging the mounting plate. The web includes a pair of second sections each of which extends from one of the first sections toward the longitudinal centerline of the shell but with the second sections splaced from the mounting plate. More particularly, each of the second sections tapers away from the mounting plate as it extends longitudinally toward the centerline of the shell. Thus, the horizontal web is varyingly spaced from the mounting plate. The blocks define a bumper means for absorbing a first quantity of energy resulting from specified impacts and the web defines another bumper means for absorbing a different quantity of energy resulting from impacts other than the specified impacts. An alternative embodiment is included wherein the web is replaced with an energy absorbing elastomeric material having a different energy absorbing capacity than the first and second pairs of blocks.

27 Claims, 7 Drawing Figures

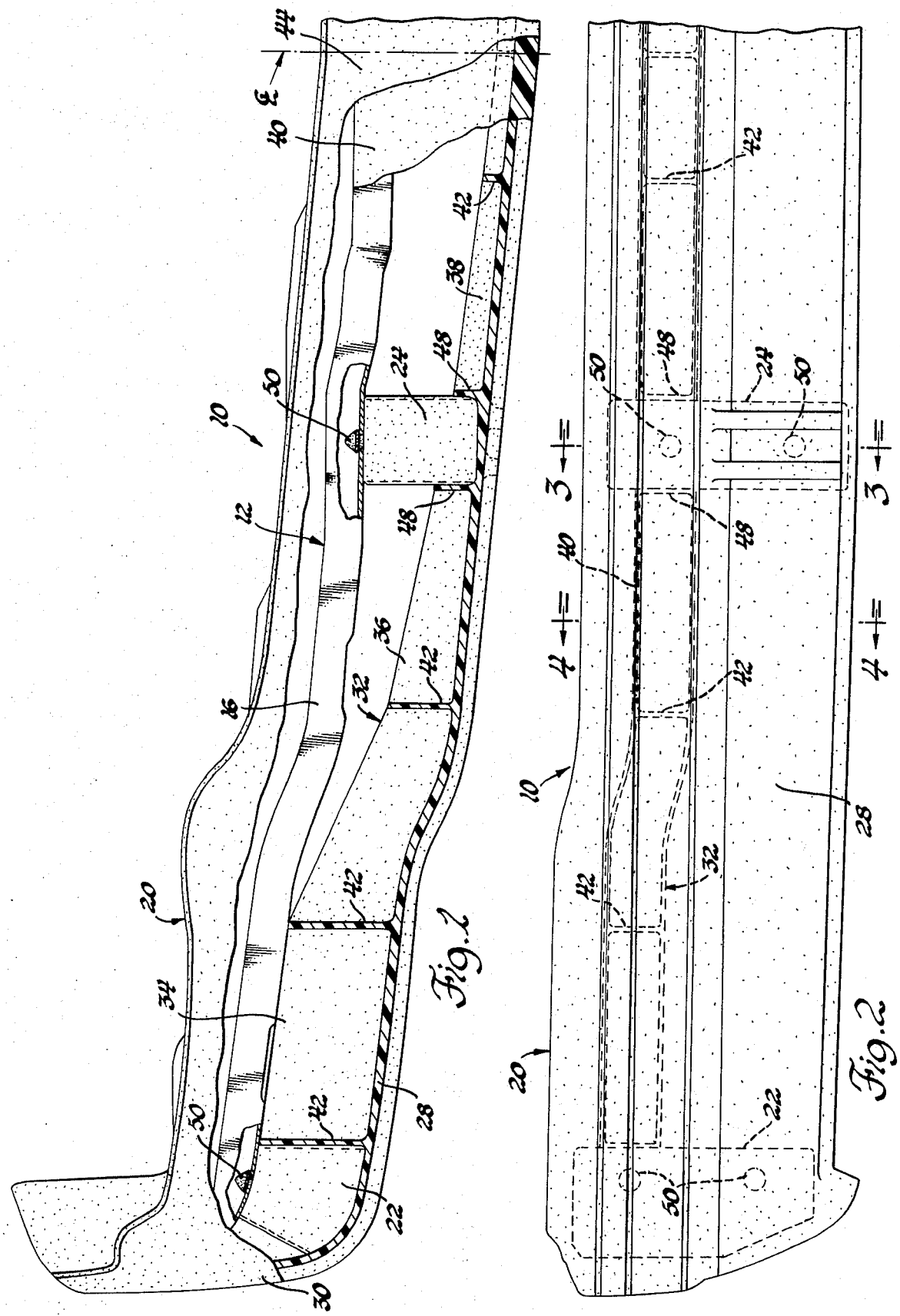

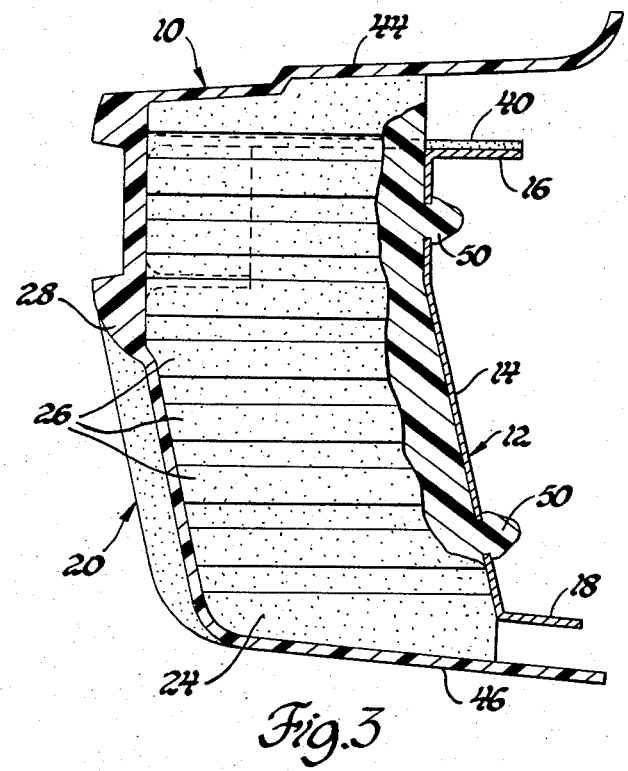
Fig.3
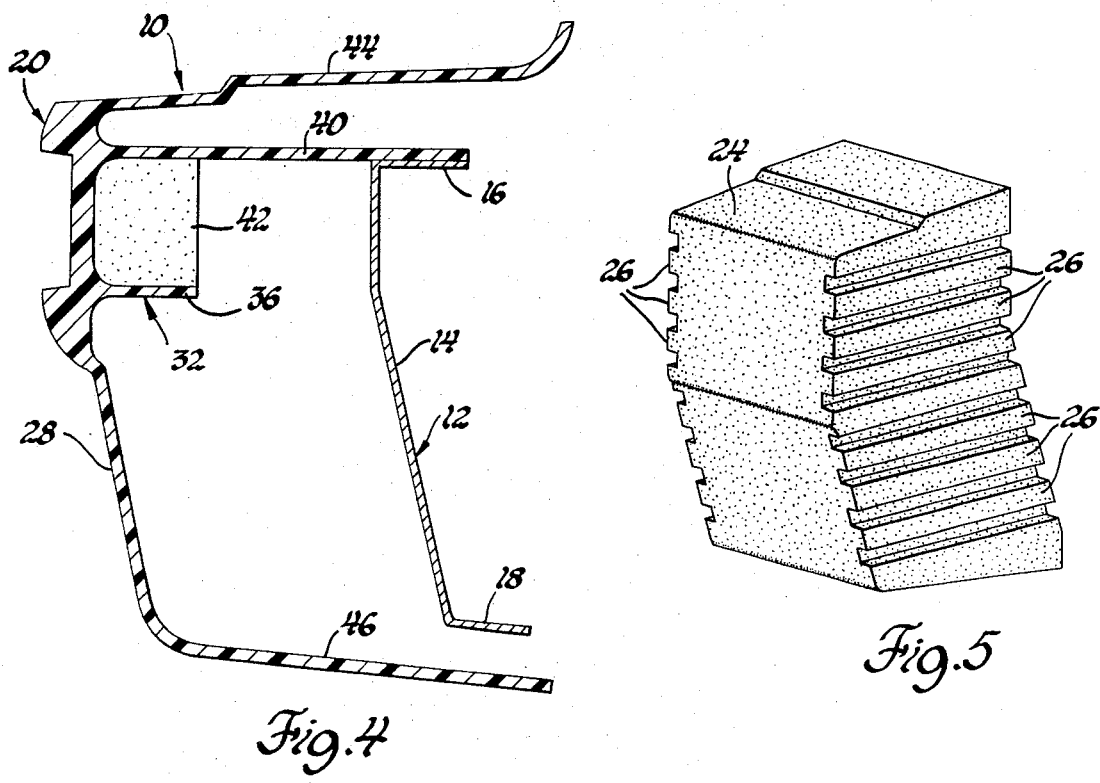
Fig.4
Fig.5

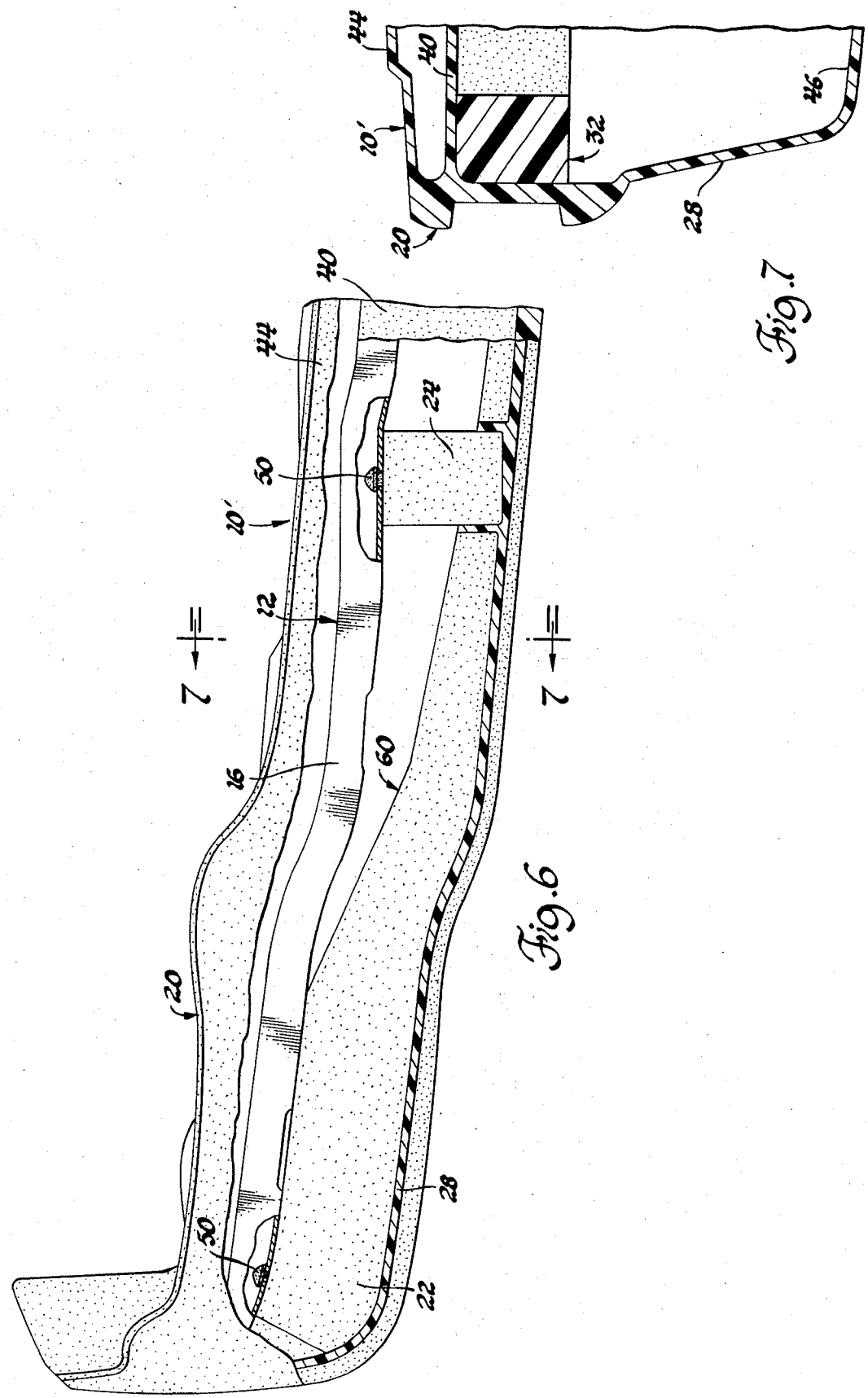

ENERGY ABSORBING BUMPER ASSEMBLY

This invention relates to an energy absorbing bumper assembly and more particularly to an energy absorbing bumper assembly for vehicles. The energy absorbing bumper assembly renders a vehicle more safe by absorbing and distributing energy upon impact of the vehicle bumper with a foreign object.

Because of the concern regarding the protection afforded to automobile occupants and vehicle body structure by bumper assemblies, Congress has passed federal safety standards setting forth requirements for the impact resistance and configuration of front and rear vehicle surfaces. These standards require that the vehicle be able to sustain a number of specified impacts at various positions along the bumper assemblies thereof. Broadly, the requirements are such that the bumper assembly must sustain specified frontal impacts and must sustain specified impacts at the ends or corners thereof.

A bumber assembly must therefore be designed to sustain these specified impacts but, in addition, there are other practical requirements which a bumper assembly must meet. Some of these practical requirements include styling, manufacturing, cost and weight considerations. In correlation with these considerations, another consideration is that a bumper assembly must also sustain non-specified impacts.

This invention therefore provides an energy absorbing bumper assembly having a configuration particularly suitable for meeting current specified impact requirements as well as meeting practical requirements.

An energy absorbing bumper assembly constructed in accordance with this invention includes a mounting means adapted for attachment to a vehicle and an elongated shell disposed adjacent the mounting means with first and second bumper means for absorbing energy disposed between the shell and the mounting means and being adapted to react with the mounting means to absorb respectively different quantities of energy. In one such a bumper assembly, the second bumper means is defined by web means extending from the shell toward the mounting means. In another such bumper assembly, the second bumper means is defined by an energy absorbing elastomeric material having a different energy absorbing capacity than the first bumper means.

Other advantages of the present invention will be readily appreciated as the same becomes better understood by reference to the following detailed description when considered in connection with the accompanying drawing wherein:

FIG. 1 is a fragmentary plan view partially broken away and in cross-section of a preferred embodiment of the instant invention;

FIG. 2 is a front elevational view of the embodiment of FIG. 1;

FIG. 3 is a cross-sectional view taken substantially along line 3—3 of FIG. 2;

FIG. 4 is a cross-sectional view taken substantially along line 4—4 of FIG. 2;

FIG. 5 is a perspective view of a block of energy absorbing elastomeric material forming a bumper means utilized in the assembly shown in FIGS. 1 through 4;

FIG. 6 is a view similar to FIG. 1 but showing an energy absorbing elastomeric material in place of the webs shown in FIG. 1; and FIG. 7 is a view taken substantially along line 7—7 of FIG. 6.

Referring now to the drawings, an energy absorbing bumper assembly constructed in accordance with the instant invention is generally shown at 10 in FIGS. 1 through 4.

The energy absorbing bumper assembly 10 includes a mounting means generally indicated at 12 adapted for attachment to a vehicle such as a passenger automobile. The mounting means 12 may be bolted, welded or otherwise secured to the frame of an automobile. The mounting means 12 comprises a metal plate 14 and integral top and bottom flanges 16 and 18 respectively, which extend rearwardly from the plate 14.

The assembly 10 also includes an elongated shell generally indicated at 20 disposed adjacent and forward of the mounting means 12.

The assembly also includes a pair of first bumper means comprising elastomeric blocks 22 and 24 disposed between the mounting means 12 and the shell 20 for absorbing a first quantity of energy resulting from specified impacts. The blocks 22 (only one shown) are disposed at opposite ends of the shell 20 and blocks 24 (only one shown) are disposed adjacent the longitudinal centerline of the shell 20. Only one-half of the shell 20 is illustrated and it will be appreciated that the other half is symmetrical to the half shown about the longitudinal centerline. The blocks 22 and 24 may be made of any of the well known resilient or elastomeric materials including natural and synthetic rubbers. Preferrably, however, the material is a foam plastic material such as microcellular polyurethane foam having a thick skin which provides strength and surface protection. The preferred formulation for the microcellular polyurethane is disclosed in U.S. Pat. No. 3,575,896.

Preferrably each of the blocks 22 and 24 include columnar ribs 26 extending transversely of or generally perpendicular to the plate 14 for adding columnar strength to the blocks 22 and 24. Each of the blocks 22 and 24 are spaced from one another longitudinally of the shell 20.

The shell 20 includes a front face 28 and ends curved as indicated at 30 to extend rearwardly from the front face 28 about and adjacent the blocks 22.

The shell 20 includes a second bumper means disposed between the mounting means 12 and the shell 20 for absorbing a different quantity of energy resulting from impacts other than the specified impacts. More specifically, the second bumper means includes web means generally indicated at 32. The web means includes a horizontal web extending longitudinally of the shell and having a first section 34 in juxtaposition to the plate 14 of the mounting means 12 adjacent the block 22 for reacting with the plate 14 of the mounting means to absorb energy. The first section 34 extends rearwardly from the front face 28 of the shell and abuts or engages the plate 14 of the mounting means 12. The web 32 also includes a second section 36 which has its rearward edge spaced from the plate 14 of the mounting means 12 adjacent the blocks 24. The second section 36 of the web 32 is integral with and extends from the first section 34 toward the block 24 in an increasing spaced relationship with the plate 14 of the mounting means 12. In other words, the rear edge of the second section 36 of the web 32 tapers in a direction away from the mounting means 12 longitudinally of the shell in a direction toward the centerline of the shell 20. The web 32 also includes a third section 38 which extends through the longitudinal centerline of the shell and between the blocks 24. The rear edge of the third section 38 of the web is disposed in spaced relationship to the plate 14 of the mounting means 12. Thus, the web 32 is varyingly spaced from the mounting means therealong and it will be appreciated that this variance in spacing determines the energy absorbed by the web 32 as the shell is impacted and the web 32 engages the mounting means 12. The shell 20 and mounting means 12 have varying configurations therealong and the web 32 varies in configuration therealong to provide the desired energy absorption at specific positions along the shell 20. More specifically, the webs 32 and 42 are designed so that during specified impacts under normal conditions the energy is absorbed by the blocks 22 and 24. However, under high temperature conditions, such as 140° F, the blocks 22 and 24 may become soft and the webs 32 and 42 are designed so as to absorb energy along with the blocks 22 and 24 during the specified impacts at such high temperatures. Of course, the webs 32 and 42 absorb energy during non-specified impacts under all conditions. Thus, the spacing of the webs from the mounting means depends upon the bumper configuration as well as the energy absorbing capacities of the blocks 22 and 24 during various conditions.

The shell includes a flange 40 which extends rearwardly from the front face 28 and is supported by the top 16 of the mounting means 12. The horizontal web 32 is disposed below and in spaced parallel relationship to the flange 40. The web means further includes generally vertically disposed webs 42 extending between the horizontal web 32 and the flange 40. The vertical webs 42 absorb energy along with the horizontal web 32.

The shell 20 also includes a cover 44 which extends rearwardly from the front face 28 and which is disposed vertically above the flange 40. The shell also includes a bottom 46 which extends rearwardly from the front face 28 at the lower extremity thereof.

The shell defines at least one pocket as formed by the webs 48 extending between the cover 44 and the bottom 46 for receiving the elastomeric block 24. The blocks 22 and 24 are supported by the plate 14 of the mounting means 12 by snap-in projections 50 which extend through holes in the plate 14.

The exterior of the shell is configured for ornamental or appearance considerations; however the webs 32 and 42 are configured to accommodate various impacts. Since the first section 34 of the web 32 contacts the plate 14 of the mounting means 12, an impact applied in the area adjacent the block 22 will be absorbed by collapse of the section 34. If the impact is at a position where it engages the block 22, the energy of the impact will be taken by the block 22 because the blocks are adapted to absorb much more energy than the webs. Likewise, impact forces on the middle portion of the bumper are taken by the two blocks 24 which are disposed on opposite sides of the longitudinal centerline of the shell 20.

The shell 20 is preferrably an integral one-piece molded plastic member. Any of a number of well known plastic materials having sufficient hardness and being readily compounded so as to provide adequate flexibility in the final product may be employed to form the shell 20.

A second embodiment of an energy absorbing bumper assembly constructed in accordance with the instant invention is generally shown at 10' in FIGS. 6 and 7. Like numerals are utilized in FIGS. 6 and 7 to identify like parts or elements as those previously described in connection with the embodiment of FIGS. 1 through 4. The only difference in the embodiment of FIGS. 6 and 7 over that previously described is that an elastomeric material 60 is substituted for the webs 32 and 42. The elastomeric material 60 has the same vertical and horizontal dimensions as defined by the webs 32 and 42. That is, the elastomeric material 60 is varyingly spaced from the mounting means in the same manner as the web 32 and has the same vertical dimension as the webs 42. The elastomeric material may be adhesively secured to the shell 20 and may be one integral piece or in the form of a series of abutting blocks.

Instead of, or in addition to, using the configuration of the elastomeric material 60 to provide the desired energy absorbing capacity, the density of the elastomeric material 60 may be varied to obtain the energy absorption capacity which differs from that provided by the blocks 22 and 24.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the invention in which an exclusive property or priviledge is claimed are defined as follows:

1. An energy absorbing bumper assembly comprising: a mounting means adapted for attachment to a vehicle, an elongated shell disposed adjacent said mounting means, first bumper means disposed between said mounting means and said shell for absorbing a first quantity of energy, and second bumper means disposed between said mounting means and said shell for absorbing a second quantity of energy, said second quantity of energy being different than said first quantity, said first and second bumper means being spaced longitudinally along said shell, said first bumper means including a plurality of spaced blocks of elastomeric material, said shell having a varying configuration therealong and said second bumper means varies in configuration longitudinally along said shell.

2. An assembly as set forth in claim 1 wherein said second bumper means comprises elastomeric material.

3. An assembly as set forth in claim 1 wherein said second bumper means includes web means extending from said shell toward said mounting means.

4. An assembly as set forth in claim 3 wherein said web means is varingly spaced from said mounting means.

5. An assembly as set forth in claim 1 wherein said second bumper means includes an elastomeric material extending from said shell toward said mounting means.

6. An assembly as set forth in claim 5 wherein said elastomeric material of said second bumper means is varyingly spaced from said mounting means.

7. An energy absorbing bumper assembly comprising: a mounting means adapted for attachment to a vehicle, an elongated shell disposed adjacent said mounting means, first bumper means disposed between said mounting means and said shell for absorbing a first quantity of energy, and second bumper means disposed between said mounting means and said shell for absorbing a second quantity of energy, said second quantity of energy being different than said first quantity, said second bumper means including web means, said web means extending from said shell toward said mounting means, said web means being varyingly spaced from said mounting means, said first bumper means including first and second blocks of elastomeric material spaced longitudinally of said shell, said web means including a horizontal web extending longitudinally of said shell, said horizontal web including a first section in juxtaposition to said mounting means adjacent said first block.

8. An assembly as set forth in claim 7 wherein said first block is disposed adjacent a first end of said shell.

9. An assembly as set forth in claim 8 wherein said shell includes a front face, said first end of said shell being curved to extend rearwardly from said front face about and adjacent to said first block.

10. An assembly as set forth in claim 8 wherein said horizontal web includes a second section spaced from said mounting means adjacent said second block.

11. An assembly as set forth in claim 10 wherein said horizontal web engages said mounting means along said first section thereof.

12. An assembly as set forth in claim 11 wherein said second section of said horizontal web extends from said first section toward said second block in an increasing spaced relationship with said mounting means.

13. An assembly as set forth in claim 12 wherein said shell comprises an integral member made of plastic.

14. An assembly as set forth in claim 13 wherein said shell includes a front face and a flange extending rearwardly from said front face and supported by said mounting means.

15. An assembly as set forth in claim 14 wherein said horizontal web is disposed below and in spaced relationship to said flange.

16. An assembly as set forth in claim 15 wherein said web means includes generally vertically disposed webs extending between said horizontal web and said flange.

17. An assembly as set forth in claim 16 wherein said shell includes a cover extending rearwardly from said front face above said flange.

18. An assembly as set forth in claim 17 wherein said shell includes a bottom extending rearwardly from said front face at the lower extremity thereof.

19. An assembly as set forth in claim 18 wherein said shell includes a second end and including another of said first blocks disposed adjacent thereto.

20. An assembly as set forth in claim 19 wherein said second block is disposed on one side of the longitudinal centerline of said shell and including another of said second blocks disposed on the other side of said centerline.

21. An assembly as set forth in claim 20 wherein said shell includes at least one pocket, at least one of said blocks being disposed in said pocket.

22. An assembly as set forth in claim 21 wherein said blocks are supported by said mounting means.

23. An assembly as set forth in claim 22 wherein said ends of said shell are curved rearwardly to extend from said front face about the adjacent first blocks.

24. An assembly as set forth in claim 23 wherein said horizontal web includes a third section extending through said centerline between said second blocks.

25. An assembly as set forth in claim 24 wherein said third section of said horizontal web is spaced from said mounting means.

26. An assembly as set forth in claim 25 wherein said mounting means comprises a metal plate.

27. An assembly as set forth in claim 26 wherein said mounting means includes top and bottom flanges extending rearwardly from said plate.

* * * * *